J. C. RHOADS.
CAR WHEEL LUBRICATOR.
APPLICATION FILED OCT. 19, 1910.
1,005,309.
Patented Oct. 10, 1911.
2 SHEETS—SHEET 1.
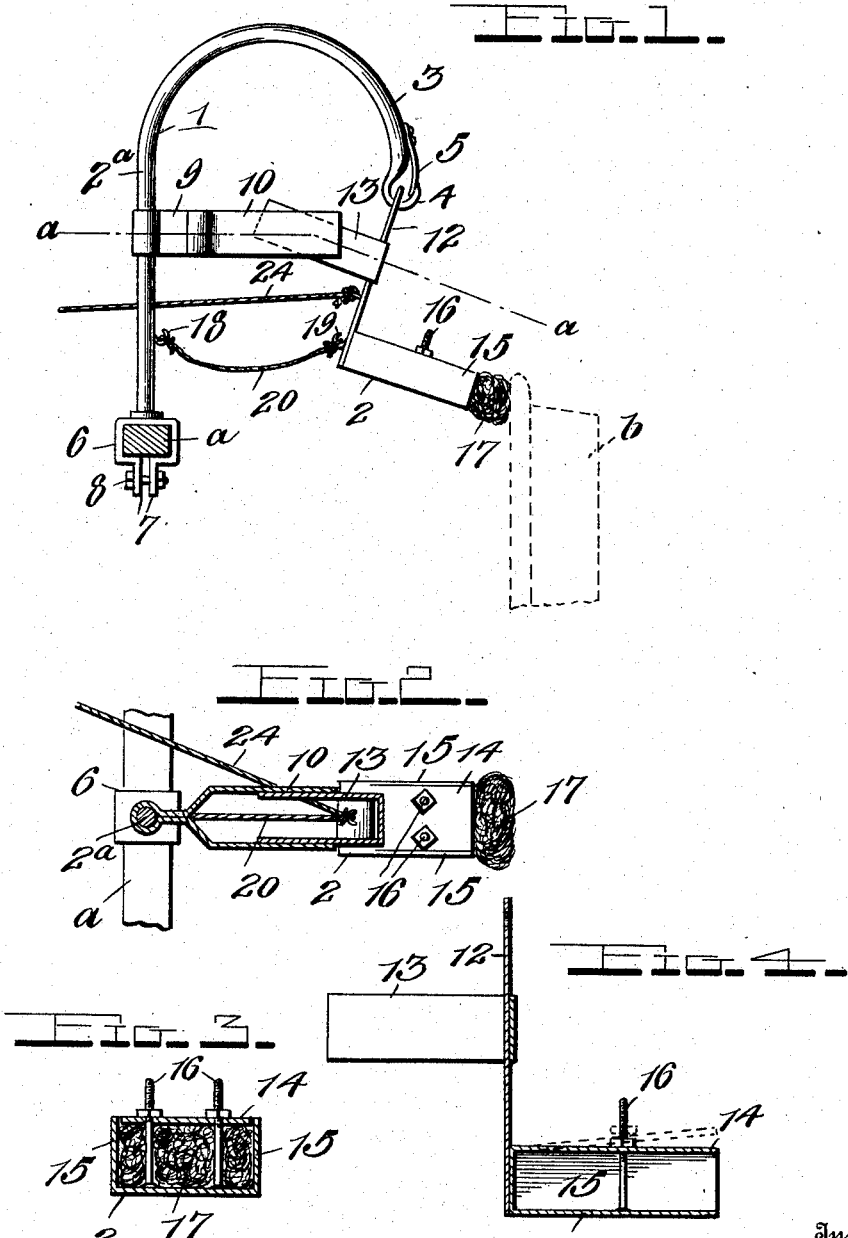

J. C. RHOADS.
CAR WHEEL LUBRICATOR.
APPLICATION FILED OCT. 19, 1910.
1,005,309.
Patented Oct. 10, 1911.
2 SHEETS—SHEET 2.
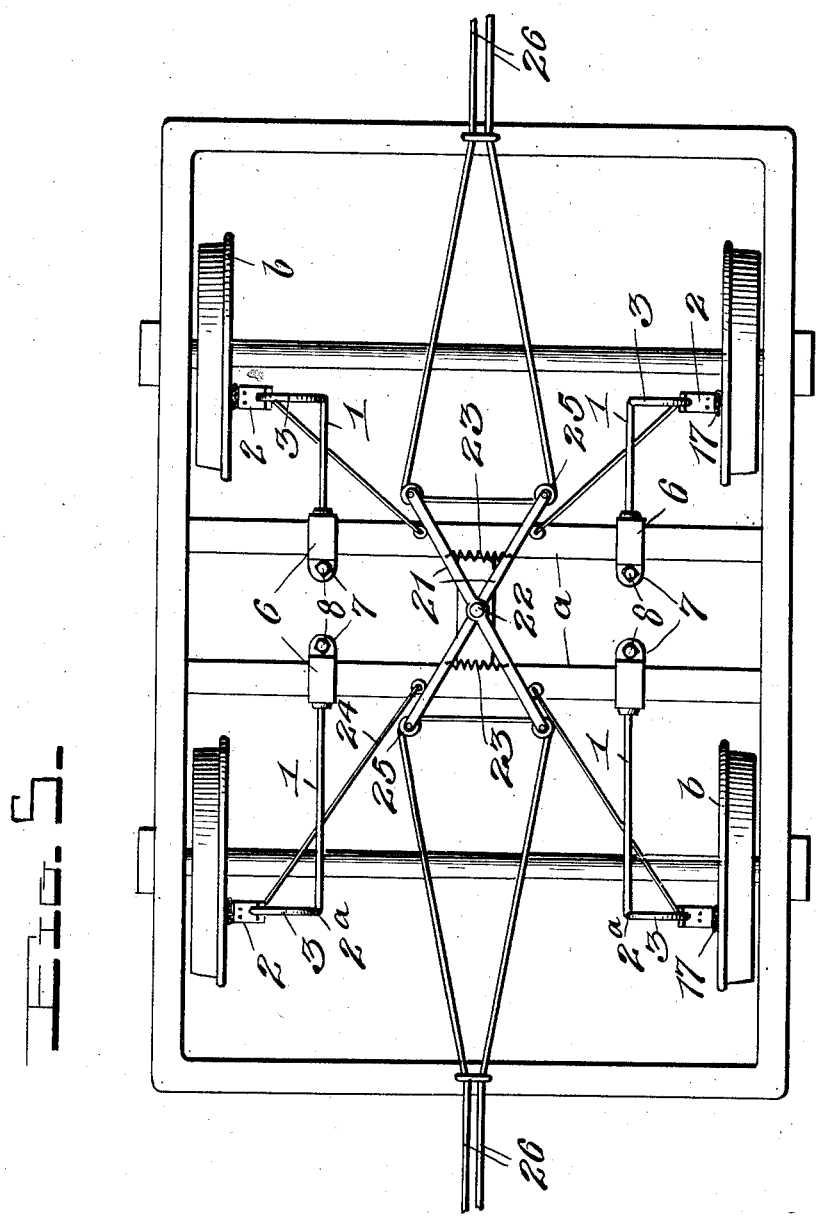
Witnesses
Chas. L. Griesbauer.
M. F. Peeler.
Inventor
J. C. Rhoads,
By Watson E. Coleman.
Attorney

UNITED STATES PATENT OFFICE.

JOHN CARPENTER RHOADS, OF PHILADELPHIA, PENNSYLVANIA.

CAR-WHEEL LUBRICATOR.

1,005,309. Specification of Letters Patent. Patented Oct. 10, 1911.

Application filed October 19, 1910. Serial No. 587,986.

*To all whom it may concern:*

Be it known that I, JOHN CARPENTER RHOADS, a citizen of the United States, residing at Philadelphia, in the county of Philadelphia and State of Pennsylvania, have invented certain new and useful Improvements in Car-Wheel Lubricators, of which the following is a specification, reference being had to the accompanying drawings.

My invention is a car wheel lubricator for lubricating the inner sides of the flanges of street car wheels, to prevent them from grinding against the sides of the grooves of the track rails around the curves and hence prevent the wearing of the car wheel flanges and of the track rails, and also prevent the unpleasant noise occasioned by such grinding.

The object of my invention is to provide an improved lubricating device which operates automatically to apply lubricant to the inner side of a car wheel or flange and is provided with means whereby it may be drawn inwardly from the wheel so as to discontinue the application of lubricant thereto.

The invention consists in the construction, combination and arrangement of devices, hereinafter described and claimed.

In the accompanying drawings—Figure 1 is a side elevation of a car wheel lubricating device constructed in accordance with my invention, and showing the same applied to a portion of a truck, and in operative relation to a car wheel. Fig. 2 is a horizontal sectional view of the same on the plane indicated by the line *a—a* of Fig. 1. Figs. 3 and 4 are detail sectional views of the lubricating box. Fig. 5 is a plan of a car truck provided with my improved lubricating devices, one for each wheel, and also showing the means for withdrawing the lubricating boxes from the car wheels when it is not desired to lubricate the car wheel flanges.

In accordance with my invention, I employ one of my improved lubricating devices for use in connection with each wheel of a street car or other railway truck. My improved lubricating device comprises a hanger or support 1, and a lubricating box 2, which is carried thereby, and suspended therefrom. The hanger or support is here shown as a standard 2ª, formed at its upper end with an outwardly extending curved arm 3, which is provided at its outer end with a hook 4, the said hook having a spring 5, to close against its bill. The standard may be secured to the car truck by any suitable means and in any suitable manner, and is located opposite one of the car wheels. As here shown, the standard has its lower end secured to a clip 6, to pass around a bar *a* or other portion of the car truck, and provided at its lower, open side, with a pair of lugs 7, having openings through which a bolt 8 extends, the bolt acting to tighten the clip on the part of the truck to which it is applied so as to firmly and yet detachably secure the standard or hanger to the truck, and without the necessity of making holes in the truck, or any portion thereof, and hence thereby weaken the same. The standard is provided with an outwardly extending horizontally disposed guide arm 9, the outer portion of which is bifurcated to form a fork 10. The lubricating box 2, is provided at its inner end with an upwardly extending arm 12 which has an opening near its upper end for engagement with the hook 4, so as to suspend the lubricating box from the arm of the standard, and enable the lubricating box to swing outwardly and inwardly toward and from the car wheel *b*. The said arm 12 is provided on its inner side with a pair of guide arms 13, of suitable length which operate between the sides of the fork 10, of the guide arm 9, and hence while enabling the lubricating box to swing inwardly and outwardly toward and from the wheel, and transversely with respect to the car truck, prevent the lubricating box from turning horizontally or longitudinally with respect to the truck.

The lubricating box is open at its outer end and its top 14 is free to move vertically between the side walls 15 of the box and is connected to the bottom of the box by means of clamping bolts 16. This lubricating box is filled with cotton waste or other suitable material indicated at 17 which waste or material is saturated with any suitable lubricant. The bolts 16 serve to clamp the top 14 of the box on the lubricating waste or material so as to hold the same in the box and enable the same to be renewed or adjusted in the box as may be required from time to time. The lubricating box by its own gravity, swings outwardly toward the car wheel so as to press the lubricating waste or fabric which projects from the open, outer end of the box, against the inner side of the flange of the car wheel and thereby automatically applies lubricant to the flange of the car wheel and prevents injurious grinding between the car wheel flange, and the groove in the track rail, around a curve. A hook 18 is connected to the standard, and a similar hook 19 is at the inner end of the lubricating box. A chain or cord 20 to prevent the undue swaying or swinging of the box is provided with loops or eyes at its ends, engaged with the said hooks. I also provide means for drawing the lubricating boxes inwardly out of contact with the car wheels, when it is not desired to lubricate the car wheels, as for instance, when the car is running on a long straight portion of the track. For this purpose, I provide a pair of crossed arms 21, which are pivotally mounted as at 22 on a suitable portion of the truck, at the center thereof, or as near the center as is practicable. These arms are adapted to turn on their pivot and springs 23 are placed between the said arms and serve to press them outwardly. Each of the arms 21 is connected as by means of a suitable cord 24 to the inner end of one of the lubricating boxes. The arms are provided at their ends with suitable pulleys 25, and operating cords 26 engage the said pulleys and extend to the platforms at the ends of the car within reach of the motorman or conductor. The cords 26 are normally slack so as to enable the springs 23 to move the ends of the arms 21 outwardly, and thereby slacken on the cords 24 so as to enable the lubricating boxes to move outwardly and engage the lubricating fabric or cotton waste with the inner sides of the car wheel flanges. When it is desired to draw the said box inwardly, so as to discontinue the lubrication of the car wheel flanges, as when the car is moving on a straight track, one of the cords 26 is drawn by the motorman or conductor from either end of the car, the said cord by reason of the bight or loop thereof being engaged with the pulleys 25, serving to draw the ends of the arms 21 toward each other, hence causing the said arms to tighten and draw upon the cords 24 and thereby causing the said cord 24 to draw the lubricating boxes inwardly away from the car wheels. Any suitable means may be employed for thus withdrawing the lubricating boxes from the car wheels, and I would have it understood that I am not limited to the means herein shown and described for accomplishing this purpose.

While I have herein shown and described what I now regard as the preferred embodiment of my invention, I would have it understood that modifications may be made within the scope of the appended claims without departing from the spirit of my invention.

I claim:—

1. A car truck having a standard provided with an arm extending toward one of the wheels, the said standard also having a guide, and a lubricating box open at its outer end, and adapted to contain a suitable fabric saturated with a lubricant, the said box having an arm extending upwardly from the inner end thereof, and flexibly connected to the said arm of the standard, the arm of the box also having a guide coacting with that of the standard to permit the box to swing inwardly and outwardly, and prevent the same from turning angularly.

2. A car truck having lubricating devices for the car wheels, each of the said lubricating devices comprising a support, a lubricating box carried by the support and movable toward and from one of the wheels, and also including guide devices for the said box, in combination with pivotally mounted operating arms, a spring to move said arms in one direction, a cord to move said arms in the reverse direction, against the tension of the said spring, and cords connecting the said lubricating boxes to the said arms for the purpose set forth.

In testimony whereof I hereunto affix my signature in the presence of two witnesses.

JOHN CARPENTER RHOADS.

Witnesses:
J. W. GARNER,
GEO. S. LIVINGSTON.

---

Copies of this patent may be obtained for five cents each, by addressing the "Commissioner of Patents, Washington, D. C."